(No Model.)
O. J. THOMAS.
PAIL ATTACHMENT.
No. 494,826. Patented Apr. 4, 1893.
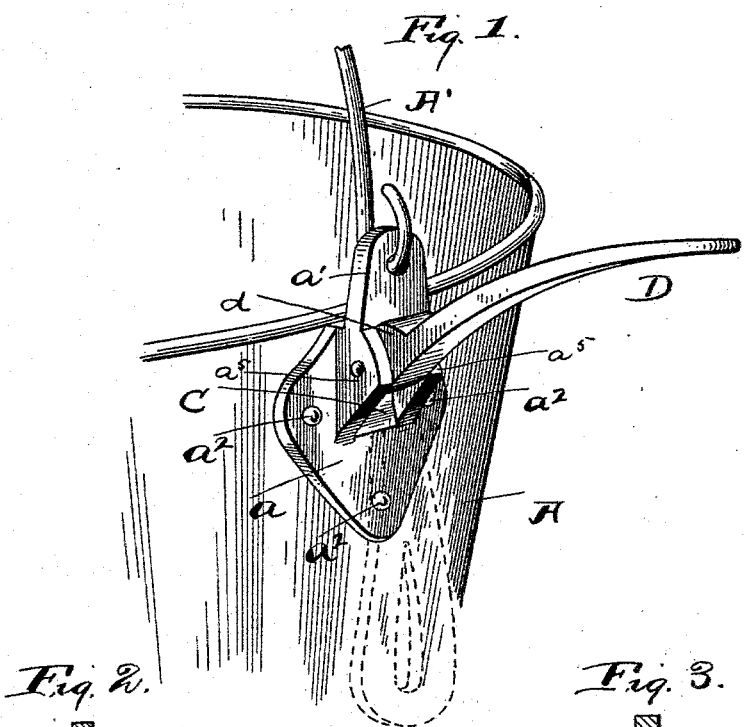
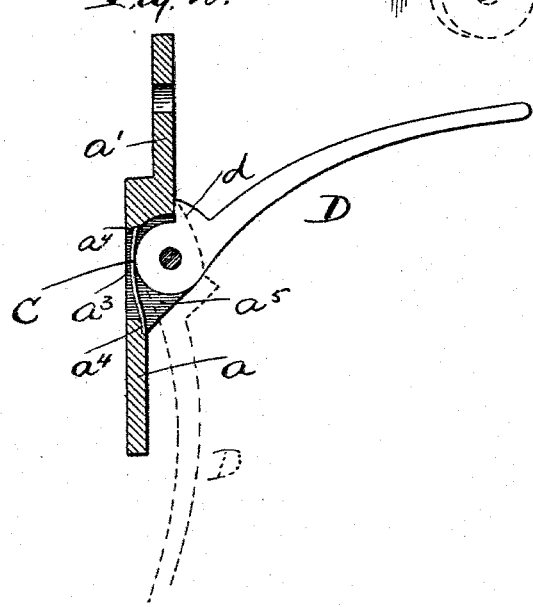
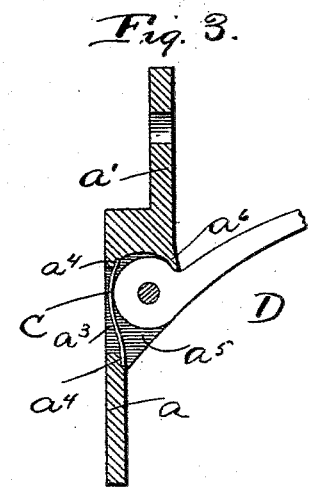
Witnesses.
E. B. Gilchrist
Inventor.
Oscar J. Thomas
By Leggett & Leggett
his attorneys.

UNITED STATES PATENT OFFICE.

OSCAR J. THOMAS, OF PENINSULA, OHIO.

PAIL ATTACHMENT.

SPECIFICATION forming part of Letters Patent No. 494,826, dated April 4, 1893.

Application filed July 7, 1892. Serial No. 439,281. (No model.)

*To all whom it may concern:*

Be it known that I, OSCAR J. THOMAS, of Peninsula, in the county of Summit and State of Ohio, have invented certain new and useful Improvements in Pail Attachments; and I do hereby declare the following is a full, clear, and exact description of the invention, such as will enable others skilled in the art to which it pertains to make and use the same.

My invention relates to improvements in milk-pails and it consists more especially in a pair of arms pivotally secured at opposite sides of said pail and adapted to be swung upward or elevated in position for resting upon the operator's legs as a support for the pail when in use, and adapted to be swung downward or out of the way when the pail is not in use, in combination with springs adapted to hold said arms in either position.

My invention also consists in certain features of construction and in combination of parts hereinafter described and pointed out in the claims.

In the accompanying drawings, Figure 1 is a view in perspective of the one side of a pail, showing my attachment in position. Fig. 2 is a central vertical section of my improved attachment. The supporting-arm is shown elevated in solid lines and folded against the side of the pail in dotted lines. Fig. 3 exhibits a slight modification hereinafter referred to.

Referring to the accompanying drawings, A represents the body of a pail; A' the bail of the same and $a$ one of the ear plates, to the ear $a'$ whereof the respective end of the bail is attached, the ear-plates being preferably riveted to the pail, as at $a^2$. It will of course be understood that although the drawings exhibit but one side of a pail provided with my improved attachment, such an attachment is applied at opposite sides of the pail, and an illustration of the one is therefore considered sufficient.

My improvements preferably are connected with the ear-plates to which the bail of a pail is attached, said plates being slotted or perforated laterally, as at $a^3$, for the accommodation of a flat spring, C, that is seated upon shoulders $a^4$ at the outer side of the ear-plate. The ear-plate, at each side of slot $a^3$, has an outwardly projecting ear, $a^5$, between which pair of ears is pivoted an outwardly extending supporting-arm D that is preferably curved, as shown, said arm, when in use, being adapted to rest upon the respective leg of the person.

A suitable stop is provided to prevent arm D from being swung upward beyond the proper elevation. This stop may consist, either (and preferably) in a lug or, projection, $d$, integral with the arm D and adapted to engage the ear-plate above the pivotal bearing of the arm when the latter has reached the elevation required, as shown in Figs. 1 and 2; or said stop may consist in a lug or projection $a^6$ on the ear-plate above the pivotal bearing of arm D and adapted to be engaged by the arm, as shown in Fig. 3. Spring C is adapted to act in the direction to bear against the pivoted end of arm D and cause the latter to press outwardly against its pivotal bearing, the construction and arrangement of parts being preferably such that such a pressure shall be exerted against the pivotal bearing of arm D in both the elevated and folded or depending position of said arm, thereby holding the arm in either of its extreme positions.

What I claim is—

1. A pail attachment consisting of an ear plate adapted to be secured to a pail below the upper rim of the latter and having a rigid arm projecting upwardly above the rim for the attachment of bail, an arm hinged to the ear plate, a shoulder in position to limit the upward movement of the hinged arm, and a spring bearing against the hinged end of the arm, substantially as set forth.

2. A pail attachment comprising an ear plate, an arm pivoted thereto, a shoulder located at a point between the arm and ear plate to limit the upward movement of the arm, shoulders $a^4$ formed in the ear plate rearward of the pivoted end of the arm, and flat spring resting on the shoulders, substantially as set forth.

In testimony whereof I sign this specification, in the presence of two witnesses, this 9th day of May, 1892.

OSCAR J. THOMAS.

Witnesses:
C. H. DORER,
WARD HOOVER.